V. BENDIX.
STARTER FOR ENGINES.
APPLICATION FILED MAR. 15, 1916.
1,250,269.
Patented Dec. 18, 1917.
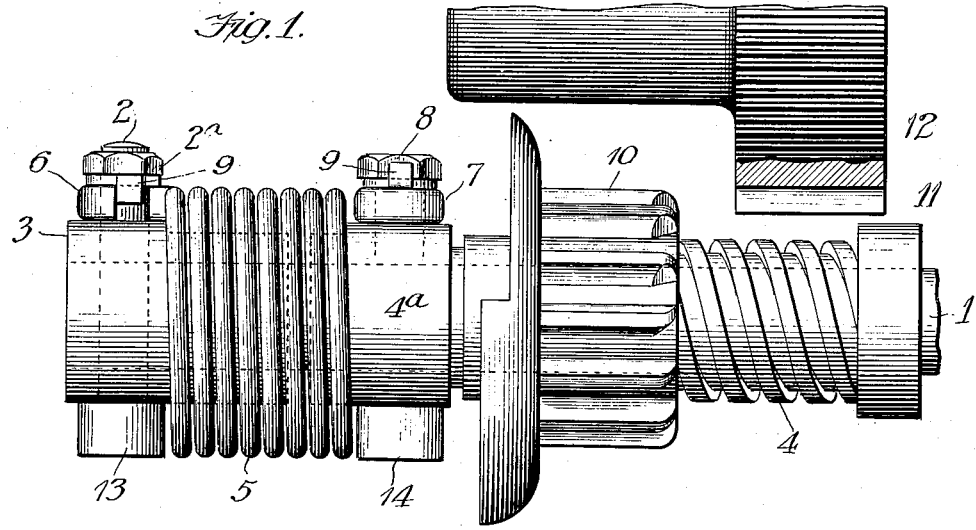
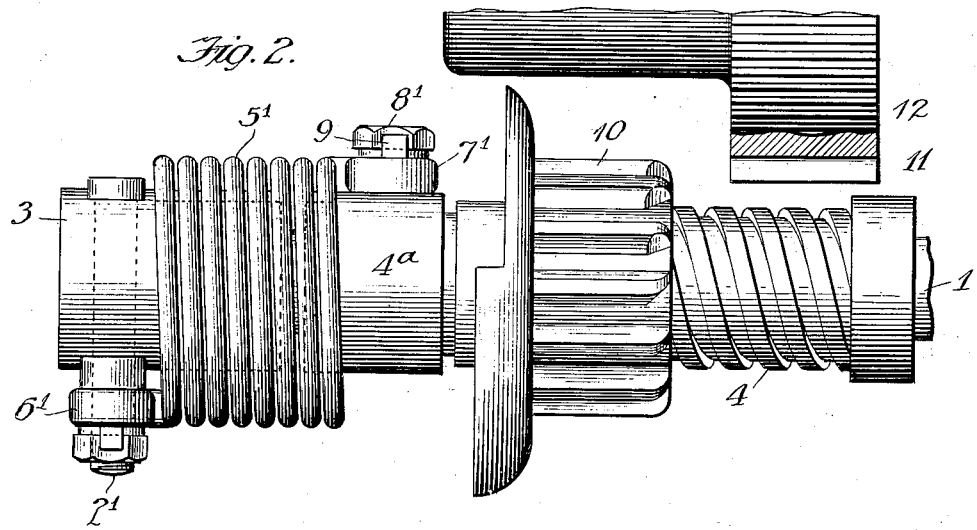

UNITED STATES PATENT OFFICE.

VINCENT BENDIX, OF CHICAGO, ILLINOIS.

STARTER FOR ENGINES.

1,250,269.   Specification of Letters Patent.   Patented Dec. 18, 1917.

Application filed March 15, 1916. Serial No. 84,462.

*To all whom it may concern:*

Be it known that I, VINCENT BENDIX, a citizen of the United States, residing at Chicago, county of Cook, and State of Illinois, have invented certain new and useful Improvements in Starters for Engines, of which the following is a specification.

My invention has relation to that type of engine starter exemplified by patents heretofore granted to me, for instance, No. 1,146,992, issued on July 20, 1915. This type of starter is provided with a screw shaft operated by a prime mover such as an electric motor, either directly from the armature shaft or indirectly by gearing therewith, and having mounted thereon a driving-member such as a pinion adapted to engage or mesh with some member of the engine to be started, such as the fly wheel of a gas engine.

The particular object of my invention is to prevent any tendency or possibility of rotation or partial rotation of the screw shaft under normal conditions, that is, when the electric motor is inert. It sometimes happens, particularly in electric motors having ball bearings, and when the brushes of the motor are not bearing with any firmness on the commutator, that the vibration of the gas engine, and of the automobile or car on which it may be mounted, will cause a partial rotation of the screw shaft due to the unbalanced character thereof because of the location of the anchoring bolts for the driving spring and of the eyes of said spring on the same side of the screw shaft, with the tendency, due to gravity, to partially rotate the screw shaft until these bolts and eyes are in a position on the under side of the screw shaft. The result of this partial rotation is to cause the pinion to move over toward the fly wheel, and in cases where there is a very close fit between the pinion and the fly wheel, that is, where a very slight movement of the screw shaft will advance the pinion into contact with the fly wheel, a clashing and interference will occur between the fly wheel and one end of the pinion. Of course where there is considerable distance between the pinion in its normal or home position and the fly wheel, the conditions above referred to are entirely immaterial, and it is only in case of certain installations where such distance is very slight that the trouble is apt to occur. Even then it would occur only when the screw shaft happened to stop with the anchoring bolts in substantially their uppermost position so that the vibration would cause a partial rotation to an extent sufficient to move the pinion over against the fly wheel. In order to overcome this possible trouble in certain installations, I balance the screw shaft either by arranging the two anchoring bolts on diametrically opposite sides, or by providing dummy bolts arranged on opposite sides of the two anchoring bolts.

In the drawing Figure 1 is an elevation of a drive embodying my invention, and Fig. 2 an elevation of a drive embodying a modified form of construction.

An engine starter system of the type herein referred to comprises a starting motor and a transmission or so-called drive for transmitting the power of the motor to the engine member, such as a fly wheel, and as my invention relates only to such drive, illustration and description is limited thereto with the exception that I have shown a portion of the extended armature shaft on the electric motor.

The extended armature shaft 1 is secured by means of a bolt 2 to a collar 3, which consequently rotates with the armature shaft. This collar is operatively connected with the collar 4ª integral with the screw shaft 4 by means of the resilient driving connection which is in the form of a collar spring 5, having at its inner end an eye 6 secured to the bolt 2 which is therefore an anchoring bolt, and at its outer end a similar eye 7 secured to an anchoring bolt 8 screwing into the collar 4ª. The bolt 2 is provided at its upper end with a nut 2ª, and both anchoring bolts are provided with lock washers 9, substantially as in my patent aforesaid.

A driving member or pinion 10 is screw-threaded upon this screw shaft and capable of a longitudinal movement thereon and a rotary movement therewith. The screw shaft is provided at its outer end with a stop collar or nut 11 against which the pinion bears when in mesh with the fly wheel of an engine as indicated at 12.

For the purpose of balancing the screw shaft, I provide in the present instance with respect to the bolt 2, an enlarged head 13, and with respect to the bolt 8, a similar but dummy bolt 14 at a point diametrically opposite such bolt 8. These parts 13 and 14 are of such size and weight as to counterbalance the spring eyes, lock washers and the nut 2ª and bolt 8, with the result that in case the armatures of the electric motor are extremely anti-friction, such as ball bearings, and in case the brushes are not adjusted tightly, there is no tendency for the screw shaft to rotate even partially and to thereby advance the pinion against the fly wheel.

In Fig. 2 I have shown a modfied form of construction according to which the regular anchoring bolts are located on diametrically opposite sides of the screw shaft. In the particular position shown the anchoring bolt 2' which is associated with the collar 3' is on the lower side with respect to the line of the screw shaft, while the bolt 8' is on the upper side thereof. Likewise, eyes 6' and 7' of the spring 5' are diametrically on opposite sides with respect to the screw shaft, with the result that the screw shaft and its associate parts are balanced.

It will be understood that my invention is not limited to any specific type or structure of the drive. For instance, the same is equally applicable to the hollow sleeve type of screw shaft such as shown in my Patent No. 1,172,864, issued on February 22, 1916, as to the solid type of screw shaft shown in my patent aforesaid.

I claim:

1. In an engine starter, the combination of a rotatable screw shaft, a pinion mounted thereon for longitudinal movement thereon and rotary movement therewith, a resilient driving mechanism for said shaft and means for counterbalancing said driving mechanism.

2. In an engine starter, the combination of a rotatable screw shaft, a pinion mounted thereon for longitudinal movement thereon and rotary movement therewith, a driving spring, a device for securing the spring to the shaft, and means for counterbalancing said device.

3. In an engine starter, the combination of a rotatable screw shaft, a pinion mounted thereon for longitudinal movement thereon and rotary movement therewith, a driving spring, an anchoring bolt for securing one end of the spring to the shaft, and means for counterbalancing said bolt.

4. In an engine starter, the combination of a rotatable screw shaft, a pinion mounted thereon for longitudinal movement thereon and rotary movement therewith, a driving member, a driving spring operatively connecting said member and the screw shaft, devices for securing the ends of the spring to the driving member and shaft respectively, and means for counterbalancing said devices.

5. In an engine starter, the combination of a rotatable screw shaft, a pinion mounted thereon for longitudinal movement thereon and rotary movement therewith, a driving member, a driving spring operatively connected with the driving member and shaft respectively, said spring having eyes at opposite ends, anchoring bolts for coöperating with such eyes for securing the spring to the driving member and shaft respectively, and means for counterbalancing the anchoring bolts and the eyes of the spring.

6. In an engine starter, the combination of a rotatable screw shaft, a pinion mounted thereon for longitudinal movement thereon and rotary movement therewith, a driving member, a driving spring operatively connected with the driving member and shaft respectively, said spring having eyes at opposite ends, anchoring bolts for coöperating with such eyes for securing the spring to the driving member and shaft respectively, and means for counterbalancing the anchoring bolts and the eyes of the spring, such means comprising a dummy bolt with respect to one of the anchoring bolts and an enlarged head with respect to the other bolt.

VINCENT BENDIX.

Witnesses:
S. E. HIBBEN,
ROBERT DOBBERMAN.